(12) United States Patent
Remley et al.

(10) Patent No.: US 7,568,723 B2
(45) Date of Patent: Aug. 4, 2009

(54) SELF-CLOSING LEADWIRE CLIP AND AIRBAG HOUSING

(75) Inventors: Jim Remley, West Jordan, UT (US);
Paul Dinsdale, Farr West, UT (US);
Dennis Talbot, West Point, UT (US)

(73) Assignee: Autoliv ASP, Inc., Ogden, UT (US)

( * ) Notice: Subject to any disclaimer, the term of this patent is extended or adjusted under 35 U.S.C. 154(b) by 399 days.

(21) Appl. No.: 11/508,686

(22) Filed: Aug. 23, 2006

(65) Prior Publication Data
US 2008/0048418 A1 Feb. 28, 2008

(51) Int. Cl.
*B65D 43/16* (2006.01)
*B60R 21/217* (2006.01)
(52) U.S. Cl. .................................. 280/728.2; 220/810
(58) Field of Classification Search ............. 280/728.2, 280/728.1; 206/1.5; 220/836, 837, 839; *B60R 21/20, B60R 21/16, 21/217, 21/21; B65D 85/04, B65D 45/16*
See application file for complete search history.

(56) References Cited

U.S. PATENT DOCUMENTS

| | | | | |
|---|---|---|---|---|
| 5,470,097 A | * | 11/1995 | Elqadah et al. | 280/728.3 |
| 5,899,486 A | * | 5/1999 | Ibe | 280/728.2 |
| 7,240,914 B1 | * | 7/2007 | Kamano | 280/728.2 |
| 7,404,597 B2 | * | 7/2008 | Romig | 296/213 |

FOREIGN PATENT DOCUMENTS

DE 102004006319 A1 9/2005
GB 2281259 A * 3/1995

* cited by examiner

*Primary Examiner*—John Q. Nguyen
*Assistant Examiner*—Nicole Verley
(74) *Attorney, Agent, or Firm*—Sally J Brown; Stoel Rives, LLP

(57) ABSTRACT

An airbag module is provided with a means for securing a leadwire. In one embodiment, the means for securing a leadwire comprises at least one self-closing leadwire clip for securing the leadwire within an airbag housing. As the cover of the airbag housing is closed, the self-closing clip(s) close and secure the leadwire in place.

21 Claims, 6 Drawing Sheets

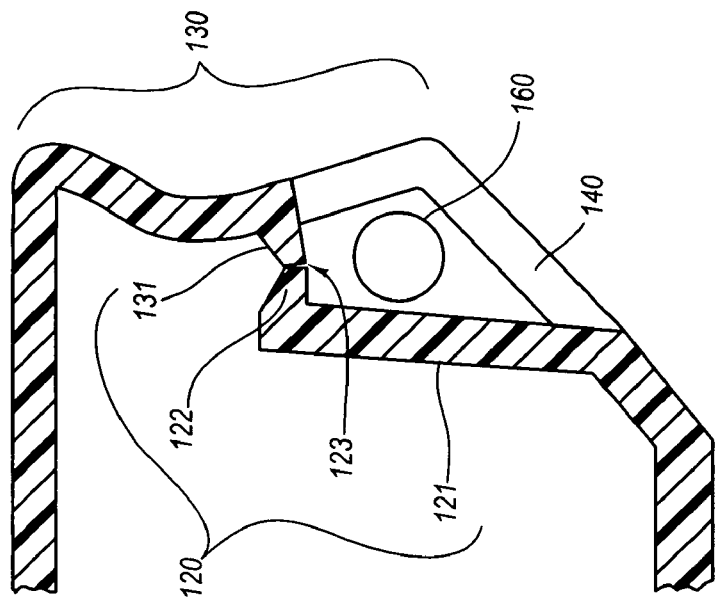
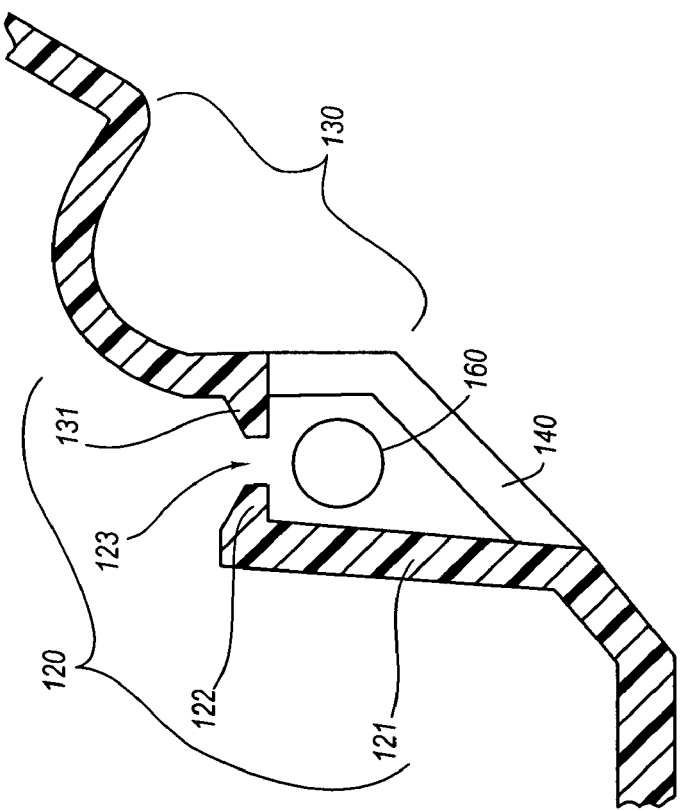
FIG. 3B
FIG. 3A

SELF-CLOSING LEADWIRE CLIP AND AIRBAG HOUSING

TECHNICAL FIELD

The present invention relates generally to the field of automotive protective systems. More specifically, the present invention relates to a self-closing leadwire clip and airbag housing.

BRIEF DESCRIPTION OF THE DRAWINGS

Understanding that the drawings depict only typical embodiments of the invention and are not therefore to be considered limiting, the invention will be described and explained with additional specificity and detail through the use of the accompanying drawings in which:

FIG. 3A is an enlarged cross-sectional view of a self-closing leadwire clip in an open configuration.

FIG. 3B is an enlarged cross-sectional view of a self-closing leadwire clip in a closed configuration.

INDEX OF ELEMENTS IDENTIFIED IN THE DRAWINGS

- 100 airbag housing
- 101 mounting plate
- 102 housing latch
- 103 raised edge
- 104 mounting plate tab
- 105 notch
- 106 leadwire opening
- 110 airbag housing cover
- 111 cover latch
- 120 self-closing leadwire clip
- 121 clip arm
- 122 leadwire clip hook
- 123 gap
- 130 hinge
- 131 protrusion
- 140 inspection window
- 160 leadwire

DETAILED DESCRIPTION

Described below are embodiments of a self-closing leadwire clip and airbag housing. As those of skill in the art will appreciate, the principles of the invention may be applied and used with a variety of airbag systems including frontal driver and passenger airbags, knee airbags, overhead airbags, curtain airbags, and the like. Thus, the present invention is applicable to airbag cushions of various shapes and sizes.

The present invention relates generally, but not exclusively, to an airbag housing having a leadwire that is routed inside the airbag housing. In one embodiment, the airbag housing has a cover, which has an open position and a closed position. The airbag housing may include at least one self-closing leadwire clip. The self-closing leadwire clip has an open configuration and a closed configuration. In the open configuration, the self-closing leadwire clip accepts the leadwire, and in the closed configuration the self-closing clip secures the leadwire. The open configuration of the self-closing leadwire clip corresponds to the open position of the airbag housing cover. Similarly, the closed configuration of the self-closing leadwire clip corresponds to the closed position of the airbag housing cover. As the cover of the airbag housing is closed, the self-closing clip closes and secures the leadwire.

Some embodiments also permit visual or electronic inspection of the position of the leadwire from outside of the closed airbag housing cover. For example, one or more inspection windows permitting visual or electronic verification of the position of the leadwire from outside of the closed airbag housing cover may be provided. This feature may allow installation and/or maintenance personnel, for example, to confirm that leadwire is positioned correctly when the airbag module is installed and during subsequent operation of the motor vehicle. In some embodiments, the self-closing leadwire clip and/or the inspection window(s) may be integrally formed with the airbag housing.

Figure 1A:
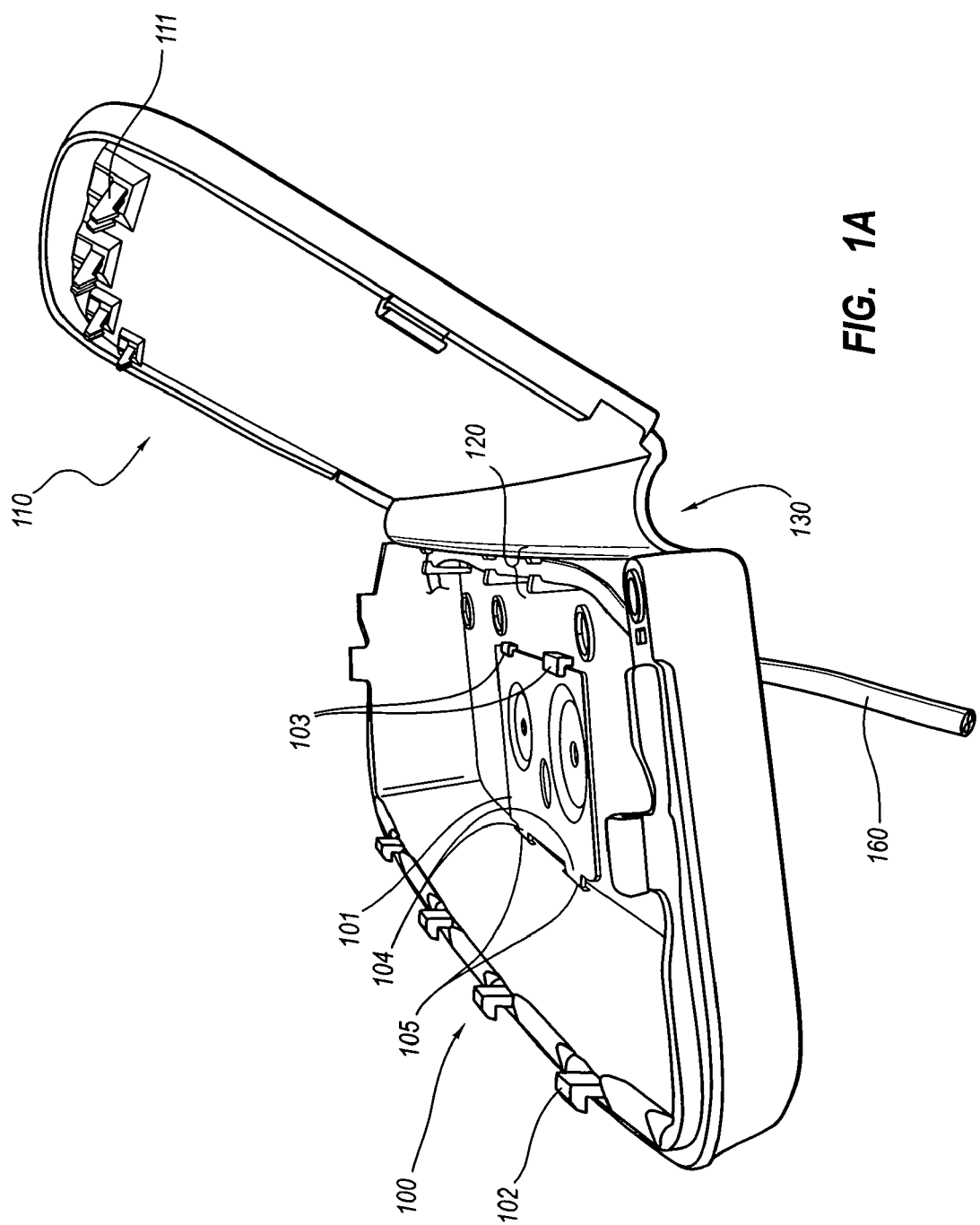
FIGS. 1A and 1B depict an airbag housing according to one embodiment of the invention in an open position.
Figure 1B:
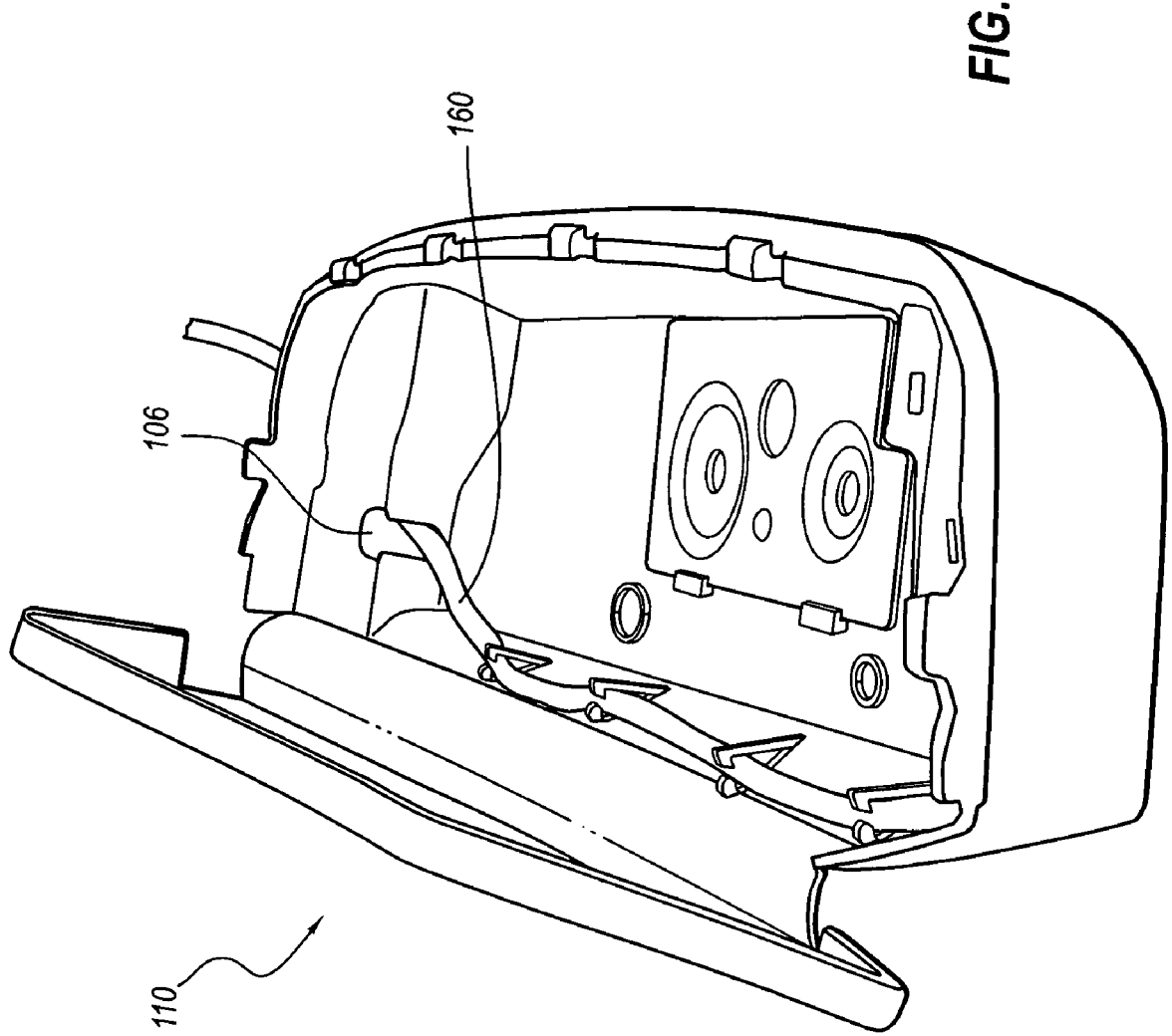

With reference to the accompanying drawings, FIGS. 1A and 1B depict an embodiment comprising an airbag housing 100, an airbag housing cover 110, and a hinge 130. In the depicted embodiment, the hinge 130 connects the airbag housing 100 and the airbag housing cover 110. The airbag housing 100 includes a mounting plate 101 to which an airbag inflator assembly (not shown) and an inflatable airbag cushion (not shown) may be mounted. The mounting plate 101 also allows the airbag housing 100 to be mounted to a motor vehicle (not shown). The mounting plate 101 may be connected to the airbag housing 100 on one side by mounting plate tabs 104 which extend into notches 105 formed in the airbag housing 100. The mounting plate 101 may be connected to the airbag housing 100 on the side opposite the mounting plate tabs 104 by a raised edge 103 under which the mounting plate 101 is positioned.

The airbag housing 100 also may include multiple housing latches 102. The airbag housing cover 110 may include a corresponding number of cover latches 111. The housing latches 102 and the cover latches 111 may be used to secure the airbag housing cover 110 in a closed position.

The airbag housing 100 may also include a leadwire opening 106 for admitting a leadwire 160. The leadwire 160 follows a path defined by the leadwire opening 106 and one or more self-closing leadwire clips 120. The leadwire 160 passes through the airbag housing 100 to a point where the leadwire 160 connects to an airbag inflator assembly (not shown).

Figure 5:
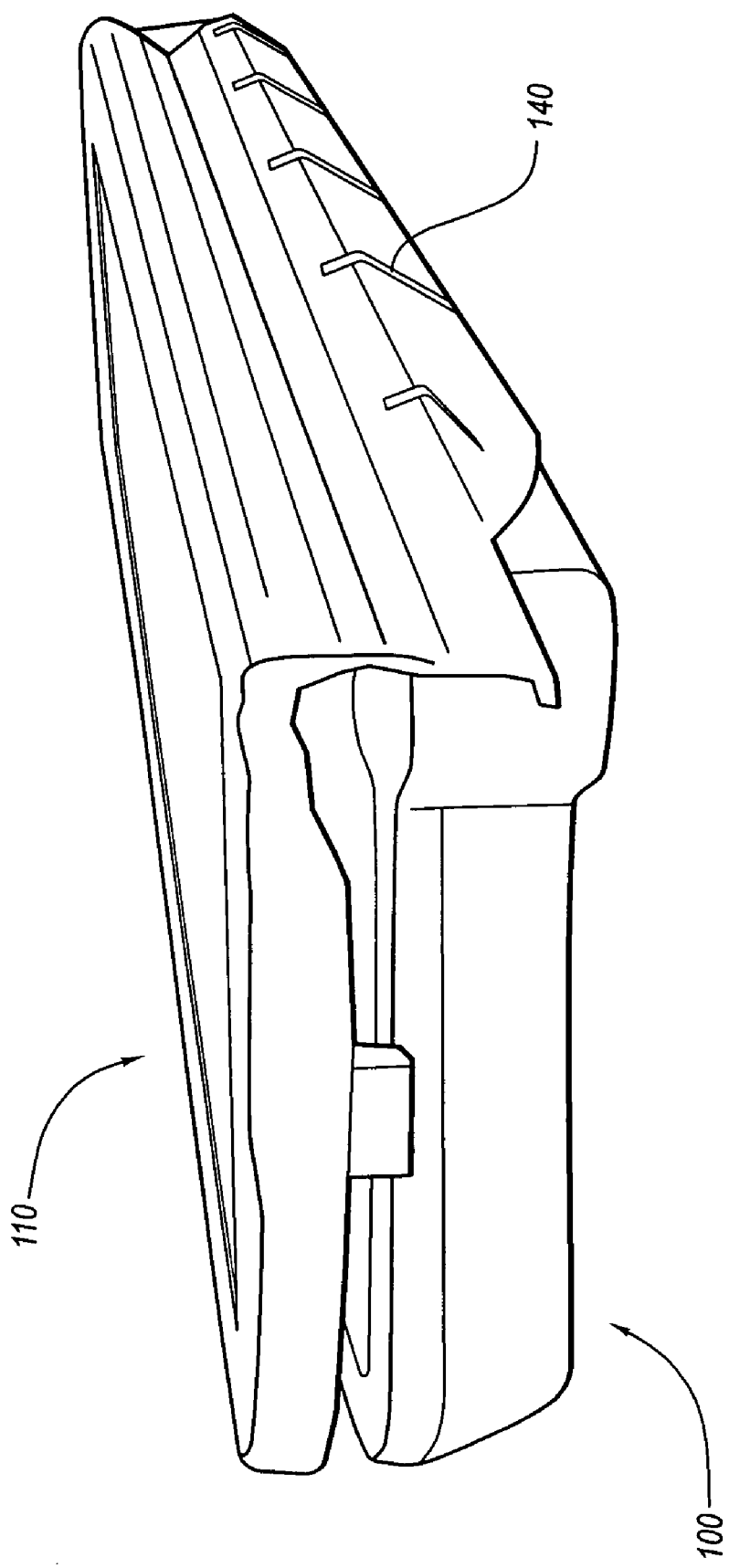
FIG. 5 depicts the airbag housing cover in a fully closed position.

The airbag housing 100, airbag housing cover 110, hinge 130, and self-closing leadwire clip 120 may be integrally formed in some embodiments, as shown generally in FIGS. 1A and 1B. These structures may be formed of a flexible plastic. Example of suitable plastics include thermoplastic elastomeric olephins (TEO), also referred to as thermoplastic elastomeric olephins (TPO), which are formed from polypropylene, ethylene propylene diene monomer (EPDM or rubber), and additives, such as the product sold as Sumitomo UT412A. Additional examples of suitable plastics include reactor grade TPO, which are formed from polypropylene, ethylene propylene rubber, and additives, such as the product sold as Bassell Adflex KSO21P. In the depicted embodiment, the flexibility of the plastic may permit the airbag housing cover to transition between an open position, as shown in FIGS. 1A and 1B, and a closed position, as shown in FIG. 5.

Figure 2:
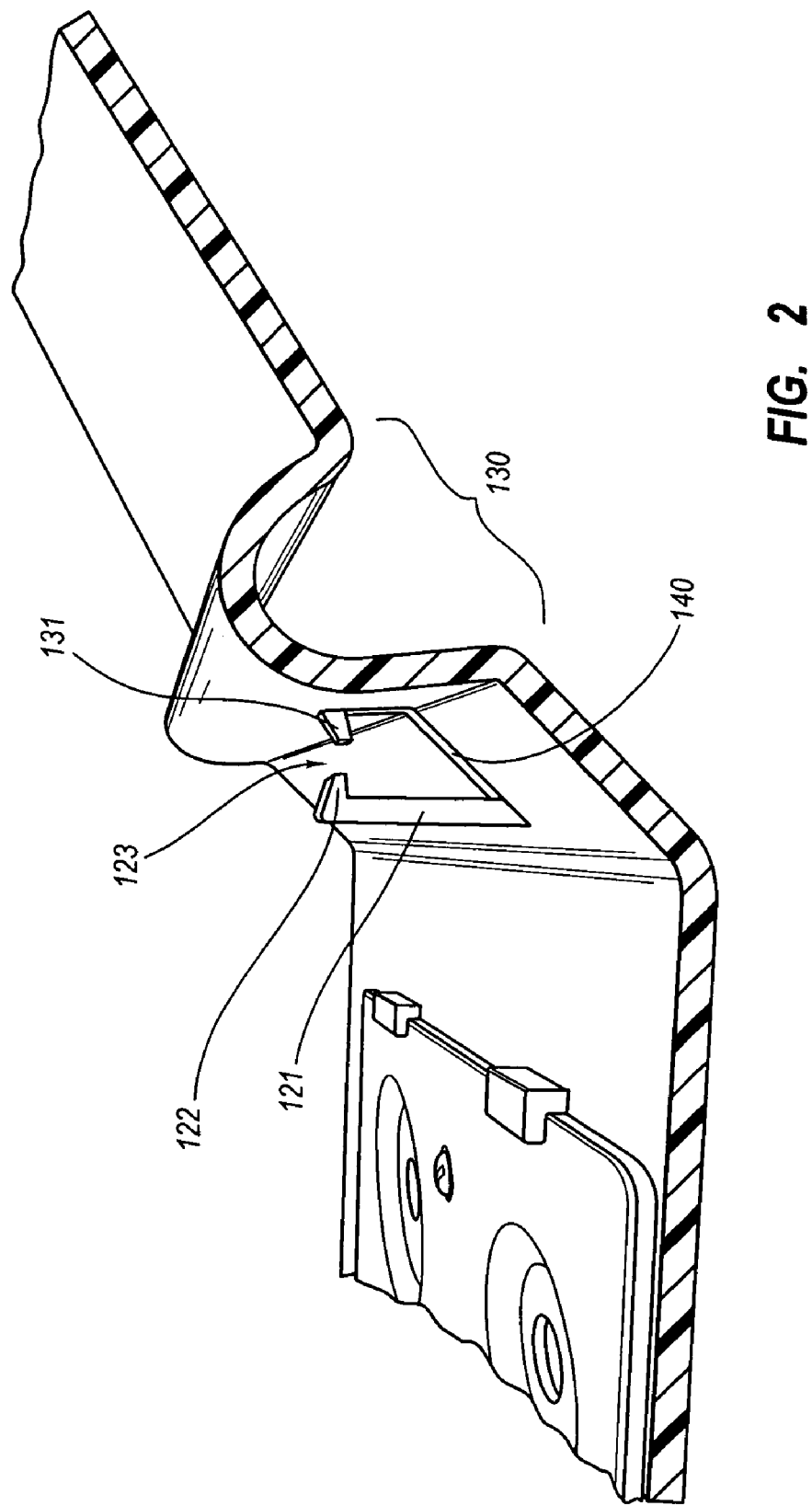
FIG. 2 is an enlarged cross-sectional view of the airbag housing depicted in FIG. 1A showing in greater detail a self-closing leadwire clip.

FIG. 2 is an enlarged cross-sectional view of a portion of the airbag housing 100 depicted in FIG. 1A. FIG. 2 shows in greater detail a self-closing leadwire clip 120 in the open configuration. In the depicted embodiment, the self-closing leadwire clip 120 comprises a clip arm 121 and a protrusion 131 connected to the hinge 130. Protrusion 131 is positioned to extend in the direction of the clip arm 121. A hook 122 extends from the clip arm 121 substantially in the direction of the protrusion 131. In the embodiment shown in FIG. 2, the hook 122 and the protrusion 131 are substantially symmetrical. In other words, the hook 122 and the protrusion 131 are mirror images of each other with respect to a plane extending midway between the hook 122 and the protrusion 131. A gap 123 is defined between the hook 122 and the protrusion 131. The gap 123 is sufficiently wide so as to admit the leadwire 160 while the clip 120 is in an open configuration. In some embodiments, the width of the gap 123 may be smaller than the diameter of the leadwire 160 because the clip arm 121 may be flexed outward as the leadwire 160 passes through the gap 123.

FIGS. 3A and 3B illustrate the self-closing functionality of the leadwire clips of one embodiment. As the airbag housing cover 110 transitions from the open position, as shown in FIGS. 1A and 1B, to the closed position, as shown in FIGS. 3B and 5, the change in shape and position of the hinge cause the protrusion 131 to at least partially close the gap 123. In some embodiments, gap 123 may fully close as cover 110 closes. As will be appreciated by inspection of FIGS. 3A and 3B, the open configuration of leadwire clip 120 corresponds to the open position of the airbag housing cover 110, and the closed configuration of the leadwire clip 120 corresponds to the closed position of the airbag housing cover 110.

In one embodiment, the self-closing clip 120 begins to close before the airbag housing cover 110 is completely closed. At least partial closure of the self-closing clip 120 may be desirable before the airbag housing cover 110 is completely closed because the correct positioning of the leadwire 160 can be visually confirmed.

Figure 4:
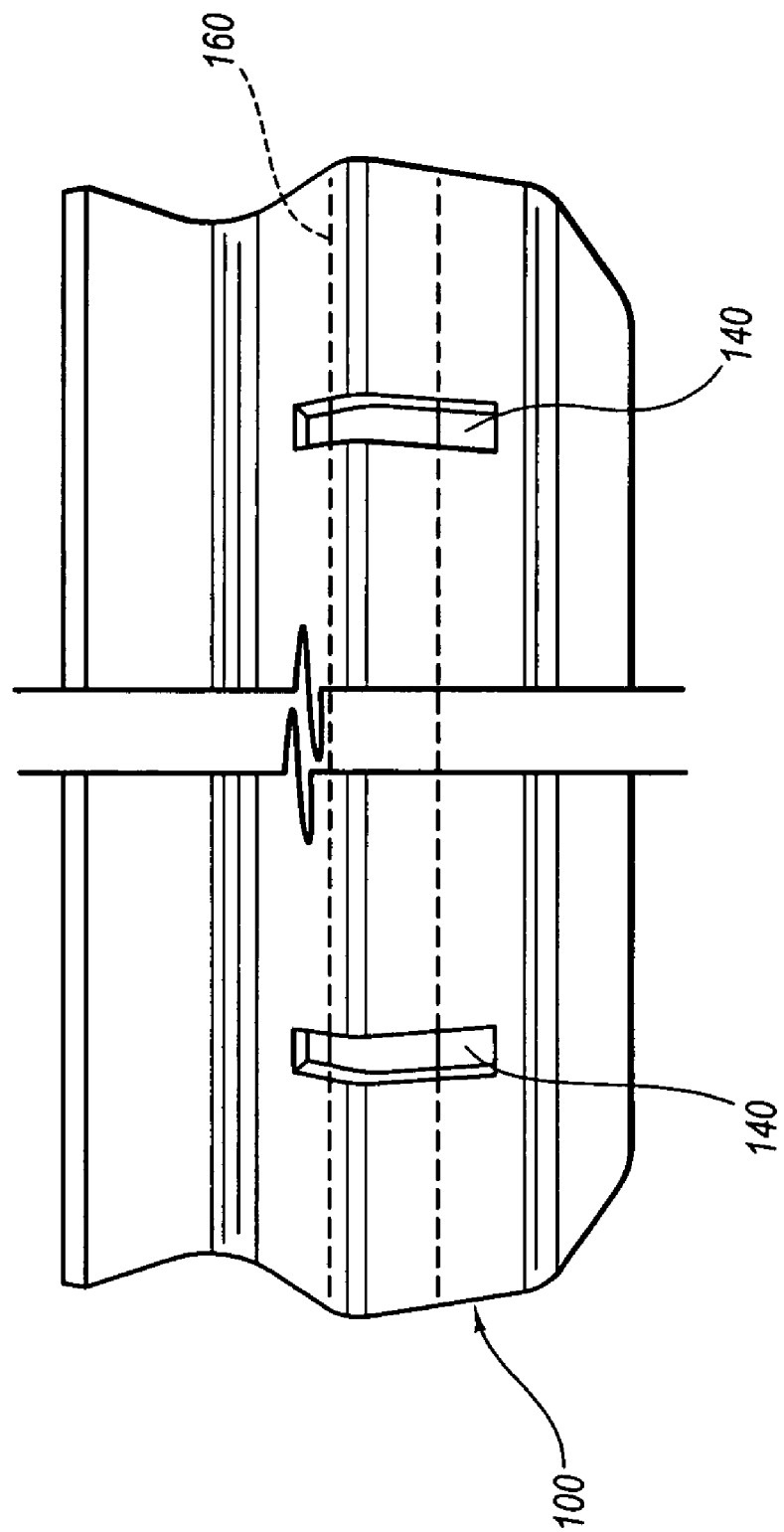
FIG. 4 depicts two visual inspection windows and the airbag housing in a closed position.

FIGS. 3A, 3B, and 4 illustrate an embodiment including an inspection window 140. The inspection window 140 may be aligned with the self-closing leadwire clip 120 or, alternatively, may be positioned elsewhere, so long as inspection window 140 allows viewing of the leadwire 160 from outside of the airbag housing 100 while the airbag housing cover 110 is in the closed position. Multiple inspection windows may be disposed in the airbag housing 100 along the length of the leadwire 160, as illustrated in FIGS. 4 and 5. The position of the leadwire 160, shown in phantom in FIG. 4, can be observed through one or more inspection windows 140 disposed along the length of the leadwire 160. Electronic inspection of the leadwire 160 may also be facilitated by the inspection window 140. In the embodiment depicted in FIGS. 3A and 3B, the inspection window 140 is positioned between the clip arm 121 and the protrusion 131 on the hinge 130. Placement of the inspection window in this location may be advantageous for some applications because this placement will allow for visualizing the interaction and position of the leadwire 160 with respect to the self-closing leadwire clip 120.

Various embodiments of an airbag housing incorporating one or more self-closing leadwire clips have been disclosed herein. The various embodiments of an airbag housing disclosed herein are examples of means for housing an airbag module. The various embodiments of an airbag housing cover disclosed herein are examples of means for covering the airbag housing. The various embodiments of a self-closing leadwire clip disclosed herein are examples of means for securing a leadwire within the housing means. The various embodiments of a visual inspection window disclosed herein are examples of means permitting visual inspection of the leadwire from outside of the closed airbag housing.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims. Note also that elements recited in means-plus-function format are intended to be construed in accordance with 35 U.S.C. § 112 ¶6.

What is claimed is:

1. An airbag apparatus for a motor vehicle, comprising:
an airbag housing connected to an airbag housing cover, the airbag housing cover having an open position and a closed position;
a leadwire routed inside the airbag housing; and
at least one self-closing leadwire clip connected to the airbag housing, the self-closing leadwire clip having an open configuration and a closed configuration, wherein the open configuration of the self-closing leadwire clip corresponds to the open position of the airbag housing cover, wherein the closed configuration of the self-closing leadwire clip corresponds to the closed position of the airbag housing cover, and wherein the self-closing leadwire clip is configured to accept the leadwire in the open configuration and to secure the leadwire in the closed configuration.

2. The airbag apparatus of claim 1, wherein the at least one self-closing leadwire clip is integral with the airbag housing.

3. The airbag apparatus of claim 1, further comprising at least one inspection window permitting visual inspection of the leadwire from outside of the airbag housing while the airbag housing cover is in the closed position.

4. The airbag apparatus of claim 3, wherein the at least one self-closing leadwire clip and the at least one inspection window are integral with the airbag housing.

5. The airbag apparatus of claim 1, wherein the at least one self-closing clip comprises a clip arm.

6. The airbag apparatus of claim 5, wherein the at least one clip arm comprises a hook connected with the clip arm.

7. The airbag apparatus of claim 1, further comprising a hinge connecting the airbag housing cover to the airbag housing.

8. The airbag apparatus of claim 7, wherein at least a portion of the self-closing clip is connected with the hinge.

9. The airbag apparatus of claim 8, wherein the at least one self-closing leadwire clip comprises a clip arm and a protrusion, and wherein the protrusion is connected with the hinge.

10. The airbag apparatus of claim 1, wherein a plurality of self-closing leadwire clips are connected to the airbag housing and are configured to secure the leadwire in the closed position.

11. An airbag apparatus for a motor vehicle, comprising:
an airbag housing having a leadwire routed inside the airbag housing;
an airbag housing cover having an open position and a closed position;
a hinge connecting the airbag housing to the airbag housing cover; and
at least one self-closing leadwire clip comprising:
a clip arm connected to the airbag housing; and
a protrusion connected to the hinge and positioned to extend in the direction of the clip arm, wherein the clip arm and the protrusion form a gap for accepting the leadwire when the self-closing leadwire clip is in an open configuration, and wherein the at least one self-closing leadwire clip responds to a transition of the airbag housing cover from the open position to the closed position by at least partially closing the gap such that the self-closing leadwire clip is in a closed configuration.

12. The airbag apparatus of claim 11, wherein at least one self-closing clip further comprises a hook extending from the clip arm substantially in the direction of the protrusion.

13. The airbag apparatus of claim 12, wherein the shape of the protrusion is substantially symmetrical to the shape of the hook.

14. The airbag apparatus of claim 11, wherein the at least one self-closing leadwire clip at least partially closes the gap between the protrusion and the clip arm before the airbag housing cover completes the transition from the open position to the closed position.

15. The airbag apparatus of claim 11, wherein the at least one self-closing clip responds to a transition of the airbag housing cover from the open position to the closed position by fully closing the gap.

16. The airbag apparatus of claim 11, further comprising at least one inspection window permitting visual inspection of the leadwire from outside of the airbag housing while the airbag housing cover is in the closed position.

17. The airbag apparatus of claim 16, wherein the at least one inspection window is disposed between the clip arm and the protrusion.

18. An airbag apparatus for a motor vehicle, comprising:
 an airbag housing;
 an airbag housing cover having an open position and a closed position;
 a hinge connecting the airbag housing to the airbag housing cover; and
 a plurality of self-closing leadwire clips, each self-closing leadwire clip having an open configuration and a closed configuration, the open configuration of the self-closing leadwire clip corresponding to the open position of the airbag housing cover, and the closed position of the self-closing leadwire clip corresponding to the closed position of the airbag housing cover, wherein the plurality of self-closing leadwire clips are configured to accept a leadwire in the open configuration, and are configured to secure the leadwire in the closed configuration.

19. The airbag apparatus of claim 18, further comprising at least one inspection window permitting visual inspection of the leadwire from outside of the airbag housing while the airbag housing cover is in the closed position.

20. An airbag apparatus for a motor vehicle, comprising:
 means for housing an airbag module;
 means for covering the housing means, the means for covering the housing means having an open position and a closed position; and
 means for securing a leadwire within the housing means, the means for securing the leadwire accepting the leadwire in an open configuration and securing the leadwire in a closed configuration, wherein the open configuration of the means for securing a leadwire corresponds to the open position of the means for covering the housing means, and wherein the closed configuration of the means for securing a leadwire corresponds to the closed position of the means for covering the housing means.

21. The airbag apparatus of claim 20, further comprising means for permitting visual inspection of the leadwire from outside of the housing means while the means for covering the housing means is in the closed position.

* * * * *